United States Patent [19]

Meraldi et al.

[11] Patent Number: 5,585,181

[45] Date of Patent: Dec. 17, 1996

[54] COMPOSITION HAVING A BASE OF CELLULOSE FORMATE CAPABLE OF PRODUCING FIBERS OR FILMS

[75] Inventors: Jean-Paul Meraldi; Vlastimil Cizek; Rima Huston, all of Zurich, Switzerland

[73] Assignee: Michelin Recherche et Technique S.A., Granges-Pacot, Switzerland

[21] Appl. No.: 466,572

[22] Filed: Jun. 6, 1995

Related U.S. Application Data

[62] Division of Ser. No. 302,753, Sep. 13, 1994.

[30] Foreign Application Priority Data

Jan. 27, 1993 [FR] France .................................. 93 01121

[51] Int. Cl.⁶ ....................................... D02G 3/00
[52] U.S. Cl. .......................... 428/357; 428/364; 428/393
[58] Field of Search ...................................... 428/364, 393, 428/35 T; 264/28

[56] References Cited

U.S. PATENT DOCUMENTS

| | | | |
|---|---|---|---|
| 3,884,631 | 5/1975 | Vigo et al. | ................................... 8/194 |
| 4,302,252 | 11/1981 | Turbak et al. | . |
| 4,744,932 | 5/1988 | Browne | . |
| 4,839,113 | 6/1989 | Villaine et al. | ............................ 264/28 |
| 4,926,920 | 5/1990 | Gouttebessis et al. | .................. 152/548 |

OTHER PUBLICATIONS

WO-A-9116357 Oct. 31, 1991.
Journal Of Polymer Science, Polymer Letters Edition, vol. 24, No. 10, 1986, New York, US, pp. 495–501 –T. Fujimoto et al. "Reaction of Cellulose with Formic Acid and Stability of Cellulose Formate".
Angewandte Makromolekulare Chemie, vol. 198, No. 3451, 1992, Basel, Switzerland, pp. 155–164, M. Schnabelrauch et al., "Readily Hydrolyzable Cellulose Esters as Intermediates for the Regioselective Derivatization of Cellulose" *summary, conclusions*.

*Primary Examiner*—Newton Edwards
*Attorney, Agent, or Firm*—Brumbaugh, Graves, Donohue & Raymond

[57] ABSTRACT

The present invention provides a composition having a base of cellulose formate capable of producing fibers or films, containing as a solvent one or more compounds selected from the group consisting of alkylsulfoxides, lactams, acyclic amides and cyclic derivatives of urea. The invention further provides a process for obtaining these fibers and films, and a regenerated cellulose fiber having a degree of substitution by formate groups of less than 3%. The fiber is useful for textile applications or in order to reinforce tires.

6 Claims, No Drawings

COMPOSITION HAVING A BASE OF CELLULOSE FORMATE CAPABLE OF PRODUCING FIBERS OR FILMS

This application is a divisional of co-pending application Ser. No. 08/302,753 filed Sep. 13, 1994.

The present invention relates to compositions for obtaining cellulose fibers or films as well as to the processes of obtaining these fibers and films, and the cellulose fibers themselves.

The production of viscose and rayon has been known for a very long time. The process for obtaining these fibers is a wet process, which has extensive pollution characteristics.

Various processes have been described in order to try to avoid these drawbacks, they being summarized below.

It has been proposed to dissolve the cellulose directly in N-oxide tertiary amines, particularly the N-oxide of N-methylmorpholine, as described, for instance, in U.S. Pat. No. 4,416,698, and DD 298 653. These solvents have the characteristic of easily decomposing, producing peroxides which may lead to explosions and cause the degradation of the cellulose.

It is known to prepare cellulose fibers by dissolving cellulose in a mixture of N,N-dimethylacetamide (DMAC) and LiCl, as described, for instance, in U.S. Pat. No. 4,302,252 and in EP-A-178 293, but this process requires a prior activating of the cellulose and does not make it possible to obtain fibers having mechanical properties which are as good as those of rayon.

Japanese Patent Applications JP-A-60-199 912 and JP-A-60-209 006 describe the production of fibers by using cellulose solutions in organic solvents containing halogenated tetra-alkylammonium compounds. This process does not make it possible to exceed a concentration of 6% by weight of dissolved cellulose, which greatly limits the mechanical properties of the fibers obtained, in particular for industrial applications.

Application WO-A-85/05115 describes the production of cellulose formate fibers from anisotropic solutions of cellulose formate in formic acid and phosphoric acid, which fibers can be regenerated. The process for the obtaining of these fibers is a non-polluting process, and the regenerated cellulose fibers obtained in this manner are characterized by very high mechanical properties; in particular, the initial modulus and the tenacity have high values. However, the fibers obtained in this way are of a very ordered structure, which reflects the anisotropic character of the starting solutions and makes them unsuitable for textile use.

The object of the present invention is to overcome these drawbacks, or limit them, by providing a composition capable of giving fibers or films, a process for the obtaining of fibers or films of regenerated cellulose, and a regenerated cellulose fiber.

The composition in accordance with the invention, which is capable of giving fibers or films, and has a base of cellulose formate, is characterized by the following points:
a) the composition is a solution;
b) the cellulose formate concentration in the composition is equal to at least 8% by weight;
c) the degree of substitution of the cellulose by formate groups is greater than 20%;
d) the composition contains as solvent one or more compounds selected from the group consisting of alkylsulfoxides, lactams, acyclic amides, and cyclic derivatives of urea.

These compounds maybe substituted or non-substituted; the substitution, if present, is effected preferably on a nitrogen atom and the substituting group is preferably the methyl group.

The process of the invention for obtaining a fiber or film of regenerated cellulose comprises the following steps:
a) the composition described above is transformed into a liquid extrudate having the shape of a fiber or film, at a temperature such that the solution is isotropic when at rest;
b) said liquid extrudate is coagulated;
c) the cellulose of the fiber or film thus obtained is regenerated;
d) the fiber or film which has thus been regenerated is washed and dried.

The regenerated cellulose fiber of the invention is characterized by the following features:
a) the degree of substitution of the cellulose by formate groups is less than 3%;
b) the fiber is formed of filaments each of which has, in cross section, a morphology which is practically continuous from the periphery up to the core;
c) the mechanical properties of the conditioned fiber are as follows:

$T \geq 10$ cN/tex; $M_i \geq 500$ cN/tex; $A_R > 5\%$;

T being the tenacity, $M_i$ being the initial modulus, and $A_R$ being the elongation upon rupture.

The composition may contain one or more compounds selected from the group consisting of alkali-metal halides, alkaline-earth metal halides and tetra-alkylammonium halides, in particular calcium chloride and/or lithium chloride.

The invention also concerns the fibers and films obtained by the process of the invention, as well as the assemblies comprising at least one fiber and/or one film in accordance with the invention.

The fibers, films and assemblies in accordance with the invention can be used, in particular, in packing, in the textile industry, or as reinforcements, for instance in order to reinforce articles of rubber or plastic materials, in particular, belts, tubes, and tires, the invention also concerning these articles.

The invention will be easily understood by means of the following non-limitative examples.

I—Measurements and Tests Used

1. Measurements carried out on the initial cellulose and on the spinning composition 1.1. Degree of polymerization (DP) of the cellulose The inherent viscosity IV of the cellulose material is determined in accordance with Swiss Standard SNV 195 598 of 1970, but at different concentrations which vary between 0.5 and 0.05 g/dl. The inherent viscosity is defined by the equation:

$$IV = \frac{1}{C} \operatorname{Ln} \frac{t}{t_0}$$

in which C represents the concentration of dry cellulose material, "t" represents the time of flow of the dilute polymer solution, $t_0$ represents the time of flow of the pure solvent, in an Ubbelohde-type viscometer, and Ln represents the natural logarithm, the measurements being carried out at 20° C.

The intrinsic viscosity $[\eta]$ is determined by extrapolation to zero concentration of the inherent viscosity IV.

The average molecular weight $\overline{M}_w$ is given by the Mark Houwink equation:

$$[\eta] = K\overline{M}_w^{\alpha}$$

in which the constants K and α are
K=$5.31 \times 10^{-4}$ and α=0.78, these constants corresponding to the solvent system used for the determination of the inherent viscosity.

These values are given by L. Valtasaari in Tappi 48, 627 (1965).

The degree of polymerization (DP) is defined by the formula:

$$DP = \frac{\overline{M}_w}{162}$$

162 being the molecular weight of the elementary unit of the cellulose.

The DP of the initial cellulose is indicated as $DP_c$ in the examples and tables which follow.

1.2. Degree of substitution (DS) of the cellulose by formate groups (degree of formylation) in the composition The spinning composition is coagulated in water in a dispersion apparatus. After filtration, washing with water and then with acetone, a powder is obtained which is dried in air at 50° C. for at least 30 minutes.

400 mg of the cellulose formate thus obtained are weighed out with precision into a 100-ml Erlenmeyer flask; 50 ml of water and 4 ml of normal caustic soda solution (1N NaOH) are added. Heating is effected at 100° C. with reflux for ½ hour under nitrogen, the cellulose being thus regenerated from its formate. After cooling, the excess sodium hydroxide is back-titrated with a decinormal solution of hydrochloric acid (0.1N HCl).

The total DS determined by this method gives the total percentage of the number of alcohol functions of the cellulose which have been esterified, that is to say DS=100% when the three alcohol functions of the unit of the cellulose are esterified, and DS=20% when 0.6 alcohol function is esterified.

The DS thus obtained therefore directly gives the percentage of alcohol functions of the cellulose which have been transformed into formate groups.

The DS of the cellulose by formate groups (degree of formylation) in the composition is indicated as $DS_f$ in the examples and tables which follow.

1.3. Degree of polymerization (DP) of the cellulose in formate form in the composition The cellulose derivative is isolated and the cellulose of this derivative is then regenerated by treating this derivative under reflux with normal sodium hydroxide. The cellulose obtained is washed with water and dried, and the DP is measured as described above in § 1.1.

The DP of the cellulose in formate form in the composition is indicated as $DP_f$ in the examples and tables which follow.

1.4. Isotropy of the solutions

A drop of the solution to be studied is placed between crossed linear polarizer and analyzer of an optical polarizing microscope, and then observed at rest, that is to say in the absence of dynamic stress, at the spinning temperature of this solution.

2. Measurements carried out on the fibers 2.1. Mechanical properties of the fibers By "conditioning" there is understood the treatment of the fibers in accordance with European Standard EN 20139 of August 1992, which substantially provides as follows:

A standard temperature atmosphere for testing is an atmosphere which has a 65±2% relative humidity and a temperature of 20°±2° C. Before a textile is tested to determine a physical or mechanical property, it is conditioned by placing it in the standard atmosphere for testing, in such a way that the air flows freely through the textile, and it is kept there for the time required to bring it into equilibrium with the atmosphere. The textile is considered to be in equilibrium when successive weighings, at intervals of 2 h, of the textile materials freely exposed to the moving air show no progressive change in mass greater than 0.25%.

The linear density of the fibers is determined in accordance with the German Standard DIN 53830 of June 1965, the fibers having been previously conditioned. The measurement is carried out on at least three samples, each corresponding to a length of 50 m, by weighing this length of fiber. The linear density is given in tex (weight in grams of 1000 meters of fiber). Federal German Standard DIN 53830 substantially provides as follows:

The "count" (which is synonymous with "linear density" or "titer") is the quotient of the weight and the length of the material in question and is expressed in tex. The weight upon which the count is based is determined in standard condition (i.e., conditioned to the standard climate (20±2)°C. and (65±2)% relative atmospheric humidity).

Skeins of a specified length with no interruptions are reeled off as samples. Interruptions include any connections in the form of knots, seals or bonds.

A six-arm precision reel with a circumference of (1000±2.1) mm fitted with an even winding mechanism and an automatic counter for displaying the reeled length is used. When the test skeins are reeled, the yarns are under the tensile force specified as follows:

| COUNT, TEX | PRETENSION FORCES, cN |
|---|---|
| UP TO 1.2 | 0.50 |
| OVER 1.2 TO 1.6 | 0.70 |
| OVER 1.6 TO 2.4 | 1.00 |
| OVER 2.4 TO 3.6 | 1.50 |
| OVER 3.6 TO 5.4 | 2.25 |
| OVER 5.4 TO 8.0 | 3.35 |
| OVER 8.0 TO 12 | 5.00 |
| OVER 12 TO 16 | 7.00 |
| OVER 16 TO 24 | 10.0 |
| OVER 24 TO 36 | 15.0 |
| OVER 54 TO 80 | 33.5 |
| OVER 80 TO 120 | 50.0 |
| OVER 120 TO 160 | 70.0 |
| OVER 160 TO 240 | 100 |
| OVER 240 TO 360 | 150 |
| OVER 360 TO 540 | 225 |
| OVER 540 TO 800 | 335 |

The skeins are individually weighed immediately after the length measurement; balance with an error margin of maximum 0.1% of the skein weight. The count in tex is calculated from the weight m in mg and the length l in meters of the skein.

The mechanical properties of the fibers (tenacity, initial modulus and elongation upon rupture) are measured by means of a traction machine of ZWICK GmbH & Co. (Federal Republic of Germany) of Type 1435 or Type 1445, in accordance with the procedure described in German Standard DIN 53834 of January 1979. Federal German Standard DIN 53834 substantially provides as follows:

A simple tensile test is used to establish the tensile-force linear-deformation characteristic including the tensile force and the linear deformation just prior to rupture of the test specimen.

A single test specimen can be of any continuous length. Any join, be it in the form of a knot, welded, bonded or otherwise, is considered to be discontinuous. A knot-free length of approximately 50 m is would off as a sample. Before the test, the wound-off samples must be conditioned in a standard atmosphere of (20±2)°C. and (65±2)% relative humidity. Test specimens for the tensile tests are continuously removed from the unwound 50 m long conditioned sample. Moreover, twists in the specimens must not become untwisted, displaced or curled throughout the test preparing period and while the test specimens are being clamped in the grips.

The strain rate is the speed with which the two clamping grips of the test instrument move apart. The test is performed at a strain rate adjusted as follows:

| AT MAXIMUM TENSILE FORCE STRAINS | ADJUSTED STRAIN RATE |
| --- | --- |
| Up to 5% | 50 mm/min |
| Up to 40% | 250 mm/min |
| Over 40% | 500 mm/min |

The maximum tensile force strain is established by preliminary tests so that the strain rate can be adjusted accordingly. Comparative examinations are based on the same strain rate, independent of the maximum tensile strain level. The test is carried out until rupture. Breaks at the grips are not considered in the test evaluation.

A tensile-force linear-deformation curve is plotted with each test. The course of the curve is used to check the behavior of the test specimen during the tensile test, particularly test specimen slip in the grips. The curve also yields the initial modulus, elongation upon rupture, and tenacity. The fibers obtained after spinning (multifilament yarns) are imparted a preliminary protective twist for the measurement and are subjected to traction over an initial length of 400 mm. All the results are obtained with an average of 10 measurements.

The tenacity (T) and the initial modulus ($M_i$) are indicated in cN per tex (centinewton per tex). The elongation upon rupture ($A_R$) is indicated in percentage. The initial modulus ($M_i$) is defined as the slope of the linear part of the force-elongation curve, which is present just after the standard pretension of 0.5 cN/tex. T, $M_i$ and $A_R$ are measured on conditioned fibers.

2.2 Chemical properties of the regenerated fibers

The DP of the cellulose is measured in the manner indicated in § 1.1.

The determination of the DS of the regenerated fibers is effected in the following manner:

About 400 mg of fiber are cut into pieces of 2–3 cm and introduced into a 100-ml Erlenmeyer flask containing 50 ml of water. 1 ml of normal sodium hydroxide solution (1N NaOH) is added. The material is mixed at room temperature for 15 minutes. The excess sodium hydroxide is titrated with a decinormal solution of hydrochloric acid (0.1N HCl). The value of DS, calculated as in § 1.2., gives the percentage of alcohol functions of the cellulose which have been transformed into formate groups.

2.3. Morphology of the regenerated fibers

The examination is carried out with an optical polarizing microscope on elementary filaments, intact and then having undergone abrasion. These filaments are observed, disposed between crossed linear polarizer and analyzer, the axis of the filaments being parallel to the plane surfaces of the polarizer and the analyzer.

II. Production of the Fibers

1. Production of cellulose formate

The cellulose formate is prepared, for example, in accordance with the aforementioned application WO-A-85/05115 from cellulose, formic acid, and orthophosphoric acid.

In order to produce the cellulose formate, the following procedure is, by way of example, employed. Powdered cellulose (the moisture of which is in equilibrium with the ambient humidity of the air) is introduced into a jacketed mixer having Z-shaped arms. A mixture of orthophosphoric acid and formic acid is then added. The three components are present for instance in the following proportions: cellulose 16%, orthophosphoric acid (99% crystalline) 46%, formic acid 38% (% by weight). Mixing is effected for 1 hour, the temperature of the mixture being maintained between 10° and 15° C. Under these conditions, for example, the DP experiences a decrease of 30% on the average. Variation of the relative proportion of formic acid makes it possible to vary the degree of substitution.

The cellulose formate solution thus obtained is extruded from the mixer having Z-shaped arms by an extrusion screw in the form of liquid rods of about 0.5 mm in diameter which are immersed in water at room temperature. By coagulation and washing neutral there are obtained cellulose formate rods which are dried with hot air at a temperature of about 120° C. It goes without saying that this method is mentioned merely by way of example. The production of thin films by, for instance, extruding the solution onto the cylinders of a calendar is entirely possible.

2. Production of the spinning compositions

The cellulose formate compositions in accordance with the invention are obtained by dissolving these rods of dry cellulose formate in the solvents studied. The following manner of operation is, for instance, employed. The rods are placed for impregnation in the solvent at room temperature for a variable period of time, which may range from 1 hour to several hours. The presolution is then introduced into a jacketed mixer having Z-shaped arms. Mixing is effected for about 15 hours, the temperature of the solution being maintained at 20°14 25° C. Possible additives (inorganic or organic salts) may be added during the mixing. During the last hour of the mixing, a vacuum of about 8 mbar is applied in order to degasify the solution. The solution is then extruded by an extrusion screw into a reservoir provided with a piston. The vacuum of about 8 mbar is maintained during the extrusion step. A faster variant consists in maintaining the solution in the mixer at 75° C. for 2 hours and then proceeding with the degasifying step for 1 hour at 20° C.

3. Spinning of the Composition 3.1. Spinning in accordance with the technique known as the technique "with non-coagulating layer of fluid" (dry jet wet)

The solution, which is at room temperature, is extruded from the storage reservoir by a piston into an extraction pump which, in its turn, pushes the solution, in succession, through a fine cartridge filter and the spinning block up into the spinning pump. From the spinning pump, the solution is extruded through a spinneret, preceded by a filter, the spinneret having 30, 50 or 250 orifices, each of a diameter of 65 or 50 micrometers. The extrudate emerging from the spinneret is therefore formed of 30, 50 or 250 elementary liquid veins. The liquid vein which comes from each orifice acquires a spinneret exit speed indicated as $V_F$ in Tables 1 and 3 which follow. During the passage from the reservoir to the spinneret, the solution is progressively brought to the desired spinning temperature ($T_F$). The spinneret is located a few millimeters above the coagulation bath. Before entering into the coagulation bath, each vein which emerges from the spinneret is drawn in a non-coagulating layer of fluid, for instance, a layer of air. In the coagulation bath, the cellulose derivative fiber is being formed. The coagulation bath has, for instance, a base of water within a temperature ($T_c$) range which may vary as a function of the type of fiber desired. Upon emergence from the coagulation bath, the fiber which has thus been formed passes into a succession of washing baths having a base of water and is then finally taken up on a drive device with a take-up speed indicated as $V_{a1}$ in Tables 1 and 3. The temperature ($T_1$) of the wash baths is generally greater than that of the coagulation bath, but not necessarily so. Upon the washing step, the fiber passes over a second drive device with a take-up speed indicated as $V_{a2}$ in Tables 1 and 3. The ratio ($V_{a2}/V_F$) between the last take-up speed and the speed of emergence from the spinneret defines the total spinning draw factor, indicated as FEF in Tables 1 and 3. When $V_{a2}$ and $V_{a1}$ have different values, there may be either a stretching of the fiber (if $V_{a2}>V_{a1}$) or a relaxation of the fiber (if $V_{a2}<V_{a1}$) between the two drive devices. The use of two drive devices is not limitative and the process of the present invention can use a single drive device or more than two drive devices.

3.2. Wet spinning

The spinning conditions are identical to the preceding conditions, with the difference that the spinneret is in contact with the coagulation bath, that is to say there is not a non-coagulating layer of fluid.

4. Regeneration of the Cellulose 4.1. Regeneration after coagulation

Upon departure from the last drive device, the wet cellulose formate fiber passes for a few seconds within a regeneration bath, generally at room temperature, in line with the spinning step, formed, for instance of an aqueous solution of sodium hydroxide, generally 2 to 5% by weight but which may vary depending on the requirements, in order to regenerate the cellulose. The regenerated fiber is then washed with water and then dried over heating rollers before being wound up.

4.2. Regeneration in the coagulation bath

One proceeds as in the preceding section, with the difference that the coagulation bath comprises caustic soda, so that it serves both for the coagulation and for the regeneration of the fiber.

5. Examples

A total of 29 fiber preparation tests are carried out in accordance with the above steps 1 to 4. The conditions of these tests are given in Tables 1 and 3 and the properties of the fibers obtained (multifilament fibers each containing 30, 50 or 250 elementary filaments) are given in Tables 2 and 4. All of these tests are in accordance with the invention.

Tables 1 and 2 concern the 25 tests carried out in accordance with the dry jet wet technique, and Tables 3 and 4 concern the four tests carried out in accordance with the wet technique.

All the percentages in Tables 1 and 3 concerning the formulation of the compositions (solvents, additives, formate) are percentages by weight, referred to the total weight of the composition.

The abbreviations used for the solvents and for the additives are as follows:

NMP: N-methylpyrrolidone
DMSO: dimethyl sulfoxide
DMF: N,N-dimethylformamide
TBAB: tetrabutylammonium bromide
EG: ethylene glycol The other abbreviations as well as the units used in Tables 1 and 3, on the one hand, and 2 and 4, on the other hand, are as follows:

$DP_c$: DP of the initial cellulose;
$DP_f$: DP of the cellulose in formate form in the composition;
$DS_f$: DS of the cellulose by formate groups (or degree of formylation) in the composition (in %);
$T_F$: Spinning temperature (in °C.);
$V_F$: Speed of emergence from the spinneret (in m/min);
$V_{a1}$: First take-up speed (in m/min);
$V_{a2}$: Second take-up speed (in m/min);
FEF: Total spinning draw factor;
$T_1$: Washing temperature (in °C.);
$T_i$: Linear density (in tex);
T: Tenacity (in cN/tex);
$A_R$: Elongation upon rupture (in %);
$M_i$: Initial modulus (in cN/tex);

The special conditions of these tests, other than those described above, are as follows:

a) Dry jet wet technique (Table 1):
—the spinneret comprises 250 holes of a diameter of 65 μm for tests 1 to 11 on the one hand and 13 to 23 on the other hand, 250 holes of a diameter of 50 μm for test 12, 50 holes of a diameter of 65 μm for test 24, and 30 holes of a diameter of 65 μm for test 25;
—the non-coagulating layer of air has a thickness of between 5 and 6 mm;
—the coagulation bath consists of water containing about 12% of the total of solvent and additive, in the same relative proportions as for the spinning compositions except in the case of test 10, where the water contains 10% NMP and 8.6% $CaCl_2$, and in the case of test 14 in which the water contains 24% NMP and less than 0.5% $CaCl_2$;
—the regeneration is effected by means of an aqueous solution of sodium hydroxide containing 5% NaOH in tests 1 to 23, and 2% NaOH in tests 24 and 25;
—the fibers are dried, after regeneration and washing, at a temperature ranging from 105° to 120° C.;
—the fibers thus obtained are therefore multifilament yarns formed of 250 filaments in tests 1 to 23, of 50 filaments in test 24, and of 30 filaments in test 25;

b) Wet technique (Table 3):
—the spinneret comprises 250 holes of a diameter of 50 μm for test 1, 50 holes of a diameter of 65 μm for test 2, and 50 holes of a diameter of 50 μm for tests 3 and 4;
—the coagulation bath is formed of water containing about 12% solvent in the same relative proportions as for the spinning compositions if a mixture of solvents is concerned (test 2);
—the regeneration is effected by means of an aqueous sodium hydroxide solution containing 5% NaOH in test 1 and 2% NaOH in tests 2 to 3; in the case of test 4, 2% NaOH was used directly in the coagulation bath;
—the fibers are dried, after regeneration and washing, at a temperature of 120° C. in test 1, 105° C. in test 2, and 90° C. in tests 3 and 4;
—the fibers thus obtained are therefore spun fibers formed of 250 filaments in test 1, and 50 filaments in tests 2 to 4.

In all the examples considered, the fibers obtained (Tables 2 and 4) have a degree of substitution by formate groups which is less than 2% and a degree of polymerization which is substantially equivalent to the degree of polymerization determined for the spinning compositions ($DP_p$), this signifying that the process does not result in any substantial decrease in the DP of the cellulose.

TABLE 1

CONDITIONS OF THE TESTS: DRY JET WET TECHNIQUE

| | | | Spinning Compositions | | Cellulose | Spinning | | | | | | |
|---|---|---|---|---|---|---|---|---|---|---|---|---|
| Test No. | $DP_c$ | $DP_F$ | $DS_f$ (%) | Solvent Type/% | Additive, type/% | formate (%) | $T_F$ (°C.) | $V_F$ (m/min) | $T_C$ (°C.) | $V_{a1}$ (m/min) | $V_{a2}$ (m/min) | FEF total | $T_1$ (°C.) |
| 1 | 1400 | 920 | 42 | NMP/70 | $CaCl_2$/8 | 22 | 69 | 41 | 4 | 124 | 135 | 3.3 | 13 |
| 2 | 1400 | 930 | 38 | NMP/76 | $CaCl_2$/7 | 17 | 73 | 48 | 6 | 128 | 130 | 2.7 | 50 |
| 3 | 1400 | 930 | 38 | NMP/76 | $CaCl_2$/7 | 17 | 53 | 52 | 48 | 128 | 130 | 2.5 | 50 |
| 4 | 1400 | 910 | 36 | NMP/78 | $CaCl_2$/8 | 14 | 51 | 41 | 8 | 82 | 82 | 2.0 | 11 |
| 5 | 1200 | 870 | 35 | NMP/79 | $CaCl_2$/9 | 12 | 60 | 59 | 8 | 130 | 130 | 2.2 | 50 |
| 6 | 500 | 480 | 42 | NMP/63 | $CaCl_2$/7 | 30 | 81 | 19 | 2 | 82 | 82 | 4.3 | 11 |
| 7 | 1400 | 850 | 36 | NMP/65 | $CaCl_2$/10 | 25 | 99 | 17 | 3 | 82 | 82 | 4.8 | 50 |
| 8 | 1400 | 960 | 40 | NMP/69 | $CaCl_2$/11 | 20 | 115 | 55 | 4 | 204 | 204 | 3.7 | 10 |
| 9 | 1400 | 610 | 37 | NMP/66 | $CaCl_2$/12 | 22 | 84 | 35 | 3 | 200 | 200 | 5.7 | 10 |
| 10 | 1400 | 610 | 37 | NMP/66 | $CaCl_2$/12 | 22 | 85 | 40 | −4 | 200 | 200 | 5.0 | 10 |
| 11 | 1400 | 690 | 35 | NMP/65 | $CaCl_2$/12 | 23 | 94 | 28 | 2 | 160 | 160 | 5.7 | 10 |
| 12 | 1200 | 820 | 35 | NMP/69 | $CaCl_2$/11 | 21 | 91 | 53 | 2 | 159 | 159 | 3.0 | 50 |
| 13 | 1200 | 850 | 37 | NMP/67 | LiCl/8 | 25 | 104 | 28 | 2 | 120 | 120 | 4.3 | 50 |
| 14 | 1200 | 810 | 40 | NMP/68 | $CaCl_2$/6.6 LiCl/2.4 | 23 | 103 | 36 | 0 | 180 | 180 | 5.0 | 50 |
| 15 | 1200 | 840 | 37 | NMP/64 DMSO/12 | — | 24 | 49 | 26 | 0 | 140 | 140 | 5.4 | 50 |
| 16 | 1200 | 780 | 41 | NMP/73 | — | 27 | 44 | 16 | 0 | 80 | 80 | 5.0 | 50 |
| 17 | 1400 | 1110 | 44 | DMSO/76 | — | 24 | 58 | 28 | 14 | 140 | 140 | 5.0 | 50 |
| 18 | 1400 | 1110 | 42 | NMP/38 DMSO/38 | — | 24 | 58 | 34 | 0 | 150 | 150 | 4.4 | 50 |
| 19 | 1400 | 1100 | 42 | NMP/45.2 DMSO/45.2 | — | 9.6 | 74 | 123 | 0 | 160 | 160 | 1.3 | 50 |
| 20 | 1400 | 1080 | 42 | DMF/68.4 | LiCl/7.6 | 24 | 95 | 37 | 0 | 160 | 170 | 4.6 | 10 |
| 21 | 1400 | 1150 | 42 | DMF/80.8 | LiCl/9.6 | 9.6 | 43 | 111 | 1 | 100 | 100 | 0.9 | 10 |
| 22 | 1400 | 970 | 31 | NMP/80.8 | LiCl/9.6 | 9.6 | 64 | 119 | 2 | 190 | 190 | 1.6 | 10 |
| 23 | 1400 | 1070 | 43 | DMSO/66 | TBAB/10 | 24 | 57 | 31 | 5 | 201 | 201 | 6.5 | 50 |
| 24 | 1200 | 850 | 36 | NMP/83.4 | $CaCl_2$/2 $H_2O$/6 | 8.6 | 0 | 40 | 23 | 40 | 40 | 1.0 | 10 |
| 25 | 550 | 500 | 40 | NMP/75.2 | $CaCl_2$/4 EG/6 | 14.8 | 49 | 36 | 21 | 40 | 40 | 1.1 | 20 |

TABLE 2

CHARACTERISTICS OF THE FIBERS OBTAINED UNDER THE CONDITIONS OF TABLE 1

| Test No. | $T_i$ (tex) | T (cN/tex) | $A_R$ (%) | $M_i$ (cN/tex) |
|---|---|---|---|---|
| 1 | 48.0 | 36.5 | 5.6 | 1550 |
| 2 | 45.7 | 37.5 | 7.2 | 1475 |
| 3 | 52.2 | 28.4 | 6.9 | 1386 |
| 4 | 51.1 | 30.6 | 8.7 | 1428 |
| 5 | 38.8 | 23.6 | 5.8 | 1304 |
| 6 | 52.7 | 37.5 | 9.5 | 1229 |
| 7 | 40.9 | 50.1 | 8.2 | 1644 |
| 8 | 39.7 | 44.1 | 7.9 | 1568 |
| 9 | 28.3 | 52.4 | 6.3 | 1937 |
| 10 | 32.7 | 51.0 | 6.1 | 1980 |
| 11 | 31.1 | 54.2 | 7.6 | 1921 |
| 12 | 32.5 | 48.6 | 7.3 | 1818 |
| 13 | 43.7 | 52.0 | 7.4 | 1939 |
| 14 | 42.4 | 42.3 | 6.2 | 1771 |
| 15 | 34.1 | 44.4 | 8.2 | 1678 |
| 16 | 42.0 | 44.0 | 8.7 | 1603 |
| 17 | 35.1 | 42.5 | 7.3 | 1654 |
| 18 | 40.8 | 38.9 | 7.0 | 1556 |
| 19 | 53.9 | 21.2 | 6.2 | 1078 |
| 20 | 40.5 | 45.5 | 7.8 | 1580 |
| 21 | 78.0 | 20.8 | 9.4 | 1007 |
| 22 | 46.0 | 21.4 | 5.3 | 1043 |
| 23 | 27.3 | 46.4 | 7.0 | 1697 |

TABLE 2-continued

CHARACTERISTICS OF THE FIBERS OBTAINED UNDER THE CONDITIONS OF TABLE 1

| Test No. | $T_i$ (tex) | T (cN/tex) | $A_R$ (%) | $M_i$ (cN/tex) |
|---|---|---|---|---|
| 24 | 13.5 | 18.9 | 11.9 | 979 |
| 25 | 11.9 | 17.6 | 12.3 | 989 |

TABLE 3

| | | | | | CONDITIONS OF THE TEST (WET TECHNIQUE) | | | | | | | |
|---|---|---|---|---|---|---|---|---|---|---|---|---|
| | Spinning Compositions | | | | | | | | | | | |
| | | | | | Cellulose | | | Spinning | | | | |
| Test No. | $DP_c$ | $DP_F$ | $DS_f$ (%) | Solvent Type/% | Additive, type/% | formate (%) | $T_F$ (°C.) | $V_F$ (m/min) | $T_C$ (°C.) | $V_{a1}$ (m/min) | $V_{a2}$ (m/min) | FEF total | $T_1$ (°C.) |
| 1 | 550 | 420 | 41.5 | NMP/83.7 | — | 16.3 | 30 | 50 | 30 | 60 | 70 | 1.4 | 30 |
| 2 | 1400 | 960 | 38.3 | NMP/81.5 DMSO/10 | — | 8.5 | 20 | 25 | 20 | 30 | 30 | 1.2 | 20 |
| 3 | 550 | 480 | 39.0 | DMSO/91 | — | 9.0 | 30 | 75 | 30 | 40 | 60 | 0.8 | 50 |
| 4 | 550 | 480 | 39.0 | DMSO/91 | — | 9.0 | 30 | 53 | 30 | 48 | 48 | 0.9 | 50 |

TABLE 4

CHARACTERISTICS OF THE FIBERS OBTAINED UNDER THE CONDITIONS OF TABLE 3

| Test No. | $T_i$ (tex) | T (cN/tex) | $A_R$ (%) | $M_i$ (cN/tex) |
|---|---|---|---|---|
| 1 | 55.7 | 14.3 | 8.7 | 888 |
| 2 | 11.2 | 15.4 | 12.2 | 843 |
| 3 | 10.3 | 15.9 | 6.7 | 937 |
| 4 | 8.7 | 11.4 | 14.3 | 636 |

Upon the production of the cellulose formate, the use of 99% orthophosphoric acid and formic acid makes it possible to obtain a high degree of substitution of more than 20% and a homogeneous distribution of these formate groups, both in the amorphous zones and in the crystalline zones of the cellulose.

Other processes for the obtaining of the cellulose formate are possible, these processes being preferably carried out in solution in order to obtain this homogeneous distribution of the formate groups.

The spinning composition produced consists of a solution in all cases. The additives are dissolved in this solution, forming at times complexes with the solvent.

These solutions, when at rest, exhibit no anisotropy at the spinning temperatures; they are therefore isotropic at these temperatures. It may happen that some of these solutions are anisotropic at rest within particular temperature ranges, but the spinning temperatures are always taken from outside of these ranges.

Upon the spinning by the technique of non-coagulating layer of fluid (dry jet wet) and in the case of a single pure solvent without additive (tests 16 and 17 of Table 1), it is preferable to have cellulose formate concentrations of more than 20% by weight since such a spinning becomes difficult with lower concentrations. The addition of the salts, in particular the calcium chloride or the lithium chloride, permits the spinning by dry jet wet within a wide range of formate concentrations, above 8% by weight, whether this concentration is less than or greater than 20%. Such an addition is therefore preferred for the dry jet wet technique, except in the case that the solvent is a mixture of pure solvents without additive (for instance NMP+DMSO in examples 15, 18 and 19 of Table 1).

The fibers obtained in accordance with the invention have a morphology which is very different from the morphology in layers which is obtained with anisotropic spinning compositions, such as that described, for instance, in Application WO-A-85/05115 referred to above. In fact, the elementary filaments of the fibers in accordance with the invention have, in cross section, a morphology which is practically continuous from the periphery up to the core.

It is understood by these terms that these elementary filaments do not contain a succession of numerous layers embedded one within the other surrounding the axis of these filaments. Upon rubbing between them, the fibers in accordance with the invention therefore have a far better resistance to fibrillation than the fibers described in the aforementioned application WO-A-85/05115.

The process in accordance with the invention has the following advantages:

—It does not result in pollution under the conditions of use, as compared with the viscose or rayon processes;

—It presents no danger, for example no risk of explosion need be feared since there is no formation of peroxide;

—It is economical, since it permits high spinning speeds and high concentrations of cellulose formate;

—It can be used within a very wide range of concentrations of cellulose formate and it can therefore be used to produce fibers the linear density and mechanical properties of which vary to a great extent;

—The recycling of the liquids used is easy.

The fiber in accordance with the invention has the following advantages:

The mechanical properties (tenacity, initial modulus, elongation upon rupture) and the linear density can be modulated within wide limits by controlling the degree of polymerization of the cellulose and the concentration of cellulose formate in the spinning composition. In this way, for instance, one can obtain a technical fiber, that is to say a fiber having a high tenacity and a high initial modulus, the tenacity and initial modulus values of which are at least as good as those of rayon.

The preferred characteristics of the composition of the invention are as follows:

—The content of water and/or of alcohol or alcohols is less than 10% of the weight of the solvent or solvents;

—The DS of the cellulose by formate groups ($DS_f$) is greater than 30%.

In the event that the composition in accordance with the invention is intended for the manufacture of an industrial fiber, it preferably has at least one of the following characteristics:

—The DP of the cellulose in the cellulose formate is at least equal to 500;

—The composition contains one or more compounds selected from the group formed of alkali-metal halides, alkaline-earth metal halides, and tetra-alkylammonium halides;

—The concentration of cellulose formate is at least equal to 18%.

Even more preferably, the composition in accordance with the invention has at least one of the following characteristics in the event that it is intended for the manufacture of an industrial fiber:

—The composition contains calcium chloride and/or lithium chloride;
—The concentration of cellulose formate is at least equal to 20%;
—The DP of the cellulose in the cellulose formate is at least equal to 600.

The process of the invention is preferably used for the obtaining of fibers (spinning process), and it is preferably carried out with a non-coagulating layer of fluid (dry jet wet) which is advantageously a layer of air.

The regenerated cellulose fiber in accordance with the invention preferably has at least one of the following properties:

—Its degree of substitution by formate groups is less than 2%;
—Its elongation upon rupture $A_R$ is at least equal to 8%.

The regenerated cellulose fiber in accordance with the invention preferably has at least one of the following properties when it is a technical fiber:

—The DP is at least equal to 500;
—The tenacity is at least equal to 40 cN/tex;
—The initial modulus is at least equal to 1000 cN/tex.

Even more preferably, this industrial fiber has at least one of the following properties:

—The DP is at least equal to 600;
—The tenacity is at least equal to 50 cN/tex;
—The initial modulus is at least equal to 1500 cN/tex.

Of course, the invention is not limited to the embodiments which have been indicated above.

Thus, solvents other than those used in the examples can be employed, in particular N-methylformamide, N-formylmorpholine, ε-caprolactam, δ-valerolactam, N-methylcaprolactam, N-methylvalerolactam, γ-pyrrolidone, 1,3-dimethyl-2-imidazolidinone, 1,3-dimethyl-3,4,5,6-tetrahydro-2-pyrimidinone, and tetramethylene sulfoxide, and, as additive, tetra-alkylammonium halides other than those indicated in the examples may be used, in particular, tetra-ethylammonium chloride, tetra-butylammonium chloride, tributylmethylammonium chloride, and tricaprylylmethylammonium chloride.

Furthermore, the compositions in accordance with the invention may contain additives other than those previously mentioned.

The expression "cellulose formate" covers cases in which the alcohol groups of the cellulose are substituted by groups other than formate groups in addition to the latter, for instance ester groups particularly acetate groups, the degree of substitution of the cellulose by these other groups being preferably less than 10%.

We claim:

1. An assembly of fibers comprising at least one regenerated multifilament cellulose yarn characterized by the following points:

a) the degree of substitution of the cellulose by formate groups is less than 3%;

b) the yarn is formed of filaments each of which has, in cross section, a morphology which is practically continuous from the periphery up to the core;

c) the mechanical properties of the conditioned yarn are as follows:

$T \geq 10$ cN/tex; $M_i \geq 500$ cN/tex; $A_R > 5\%$;

T being the tenacity, $M_i$ being the initial modulus, and $A_R$ being the elongation upon rupture.

2. An assembly according to claim 1 wherein the yarn is characterized by the fact that it satisfies at least one of the following characteristics:

its degree of substitution by formate groups is less than 2%;

$A_R \geq 8\%$.

3. An assembly according to claim 1 wherein the yarn is characterized by the fact that the degree of polymerization (DP) of the cellulose is equal to at least 500.

4. An assembly according to claim 1 wherein the yarn is characterized by the fact that it has at least one of the following properties:

T is equal to at least 40 cN/tex;

$M_i$ is equal to at least 1000 cN/tex.

5. An assembly according to claim 1 wherein the yarn is characterized by the fact that the DP is at least equal to 600.

6. An assembly according to claim 4 wherein the yarn is characterized by the fact that it has at least one of the following properties:

T is equal to at least 50 cN/tex;

$M_i$ is equal to at least 1500 cN/tex.

* * * * *

UNITED STATES PATENT AND TRADEMARK OFFICE
CERTIFICATE OF CORRECTION

PATENT NO. : 5,585,181
DATED : Dec. 17, 1996
INVENTOR(S) : Meraldi et al.

It is certified that error appears in the above-indentified patent and that said Letters Patent is hereby corrected as shown below:

Col. 1, line 66, "maybe" should read --may be--.
Col. 4, line 66, "would" should read --wound--.
Col. 6, line 35, "20°14 25° C." should read --20° - 25° C.--.
Col. 9, TABLE 1, heading on 5th col. under "Spinning Compositions", "Solvant" should read --Solvent--; TABLE 1, Test No. 12, 4th col., "NMP/69" should read --NMP/68--.
Col. 11, TABLE 3, heading on 5th col. under "Spinning Compositions," "Solvant" should read --Solvent--.

Signed and Sealed this

Third Day of June, 1997

Attest:

BRUCE LEHMAN

Attesting Officer

Commissioner of Patents and Trademarks